(12) United States Patent
Jannach

(10) Patent No.: US 10,850,486 B2
(45) Date of Patent: Dec. 1, 2020

(54) HIGH PRESSURE LAMINATE PANEL AND METHOD FOR THE PRODUCTION THEREOF

(71) Applicant: FunderMax GmbH, St. Veit an der Glan (AT)

(72) Inventor: Gerhard Jannach, St. Veit an der Glan (AT)

(73) Assignee: FUNDERMAX GMBH, St. Veit an der Glan (AT)

( * ) Notice: Subject to any disclaimer, the term of this patent is extended or adjusted under 35 U.S.C. 154(b) by 204 days.

(21) Appl. No.: 16/064,396

(22) PCT Filed: Dec. 22, 2016

(86) PCT No.: PCT/EP2016/082459
§ 371 (c)(1),
(2) Date: Jun. 20, 2018

(87) PCT Pub. No.: WO2017/109118
PCT Pub. Date: Jun. 29, 2017

(65) Prior Publication Data
US 2018/0370209 A1    Dec. 27, 2018

(30) Foreign Application Priority Data
Dec. 23, 2015  (EP) .................................... 15202487

(51) Int. Cl.
| | | |
|---|---|---|
| *B32B 27/42* | (2006.01) | |
| *C08G 18/79* | (2006.01) | |
| *C08F 290/06* | (2006.01) | |
| *C08G 18/10* | (2006.01) | |
| *C09D 175/14* | (2006.01) | |
| *B32B 27/08* | (2006.01) | |
| *C08G 18/67* | (2006.01) | |
| *C08G 18/54* | (2006.01) | |
| *B32B 5/26* | (2006.01) | |
| *B32B 15/12* | (2006.01) | |
| *B32B 15/08* | (2006.01) | |
| *B32B 27/36* | (2006.01) | |
| *B32B 21/10* | (2006.01) | |
| *B32B 21/06* | (2006.01) | |

(Continued)

(52) U.S. Cl.
CPC ............. *B32B 27/42* (2013.01); *B32B 5/022* (2013.01); *B32B 5/26* (2013.01); *B32B 7/04* (2013.01); *B32B 9/002* (2013.01); *B32B 9/045* (2013.01); *B32B 9/047* (2013.01); *B32B 9/06* (2013.01); *B32B 15/08* (2013.01); *B32B 15/09* (2013.01); *B32B 15/092* (2013.01); *B32B 15/098* (2013.01); *B32B 15/12* (2013.01); *B32B 15/14* (2013.01); *B32B 21/06* (2013.01); *B32B 21/08* (2013.01); *B32B 21/10* (2013.01); *B32B 25/06* (2013.01); *B32B 25/08* (2013.01); *B32B 25/10* (2013.01); *B32B 27/06* (2013.01); *B32B 27/08* (2013.01); *B32B 27/10* (2013.01); *B32B 27/12* (2013.01); *B32B 27/36* (2013.01); *B32B 27/38* (2013.01); *B32B 29/002* (2013.01); *B32B 29/005* (2013.01); *B32B 29/02* (2013.01); *B32B 37/10* (2013.01); *C08F 290/067* (2013.01); *C08G 18/10* (2013.01); *C08G 18/544* (2013.01); *C08G 18/678* (2013.01); *C08G 18/792* (2013.01); *C09D 175/14* (2013.01); *B32B 2255/00* (2013.01); *B32B 2255/02* (2013.01); *B32B 2255/06* (2013.01); *B32B 2255/08* (2013.01); *B32B 2255/10* (2013.01); *B32B 2255/12* (2013.01); *B32B 2255/26* (2013.01); *B32B 2260/023* (2013.01); *B32B 2260/028* (2013.01); *B32B 2260/046* (2013.01); *B32B 2260/048* (2013.01); *B32B 2262/02* (2013.01); *B32B 2262/10* (2013.01); *B32B 2270/00* (2013.01); *B32B 2307/406* (2013.01); *B32B 2307/4026* (2013.01); *B32B 2307/536* (2013.01); *B32B 2307/584* (2013.01); *B32B 2307/71* (2013.01); *B32B 2307/712* (2013.01); *B32B 2307/714* (2013.01); *B32B 2355/00* (2013.01); *B32B 2419/00* (2013.01); *B32B 2451/00* (2013.01)

(58) Field of Classification Search
CPC ...................................................... B32B 27/42
See application file for complete search history.

(56) References Cited

U.S. PATENT DOCUMENTS 5,976,304 A  *  11/1999  Horvath ................. C08G 18/68
                                                          156/331.1

FOREIGN PATENT DOCUMENTS

| DE | 3925451 | 9/1990 |
|---|---|---|
| EP | 0846135 | 6/1998 |

(Continued)

OTHER PUBLICATIONS

PCT International Preliminary Report on Patentability issued in International Application No. PCT/EP2016/082459, dated Jun. 26, 2018.

(Continued)

*Primary Examiner* — Daniel H Lee
(74) *Attorney, Agent, or Firm* — Parker Highlander PLLC

(57) ABSTRACT

The invention relates to a high pressure laminate panel having a surface layer on at least one panel surface, which has as the outermost layer a polymer coating with a polyurethane(meth)acrylate polymer, and which is characterized by excellent scratch resistance and resistance to weathering. Furthermore, a method for the production of polyurethane (meth)acrylate-coated high pressure laminate panels is provided.

13 Claims, No Drawings

(51) Int. Cl.

| | |
|---|---|
| *B32B 21/08* | (2006.01) |
| *B32B 27/38* | (2006.01) |
| *B32B 27/12* | (2006.01) |
| *B32B 7/04* | (2019.01) |
| *B32B 5/02* | (2006.01) |
| *B32B 25/08* | (2006.01) |
| *B32B 29/02* | (2006.01) |
| *B32B 9/00* | (2006.01) |
| *B32B 25/10* | (2006.01) |
| *B32B 27/06* | (2006.01) |
| *B32B 9/06* | (2006.01) |
| *B32B 15/14* | (2006.01) |
| *B32B 27/10* | (2006.01) |
| *B32B 9/04* | (2006.01) |
| *B32B 15/092* | (2006.01) |
| *B32B 29/00* | (2006.01) |
| *B32B 15/09* | (2006.01) |
| *B32B 25/06* | (2006.01) |
| *B32B 15/098* | (2006.01) |
| *B32B 37/10* | (2006.01) |

(56) References Cited

FOREIGN PATENT DOCUMENTS

| EP | 0850698 | 7/1998 |
|---|---|---|
| WO | WO 97/33929 | 9/1997 |

OTHER PUBLICATIONS

PCT International Search Report and Written Opinion issued in International Application No. PCT/EP2016/082459, dated Mar. 30, 2017.

* cited by examiner

HIGH PRESSURE LAMINATE PANEL AND METHOD FOR THE PRODUCTION THEREOF

This application is a national phase application under 35 U.S.C. § 371 of International Application No. PCT/EP2016/082459, filed Dec. 22, 2016, which claims benefit of European Application No. 15202487.3, filed Dec. 23, 2015, the entire contents of each of which are hereby incorporated by reference.

The invention relates to a high pressure laminate panel having a surface layer on at least one panel surface, which as the outermost layer has a polymer coating with a polyurethane(meth)acrylate polymer and which is characterized by excellent scratch resistance and weather resistance. Furthermore, a method for the production of polyurethane (meth)acrylate-coated high pressure laminate panels is provided.

Polyurethane acrylates are suitable components for coatings in many fields of application. Polyurethane acrylates as weather protection for decorative surfaces are described for example in EP 846135. For applications in the construction sector, decorative surfaces must meet particularly high requirements. On the one hand with regard to mechanical properties such as scratch resistance and surface hardness, and on the other hand with regard to weathering, in particular resistance to climate, light and UV radiation. Moreover, not only the technical properties have to exhibit exceptional durability for the long-term protection of the building but the decorative properties as well. In particular, a high degree of color stability and a consistent degree of gloss of the surface is expected. This problem is partly solved in EP 846135, but the relatively brittle surface poses some limitations on the scratch resistance. In addition, the gloss level of the surface is subject to changes due to the exposure to weather conditions.

Alternatives for the provision of decorative surfaces by means of radiation-cured coatings are described in EP 0166153 A1, EP 0216269 A2, EP 1122062 A2 and WO 2008/147180 which can lead to surfaces with a very high scratch resistance. The disadvantages of such coatings and the processes for their application are the elaborate and costly technical facilities as well as the poor handleability of the decorated semi-finished product due to its pronounced curl stemming from the curing process, which leads to rejects in the subsequent production process.

Furthermore, it can be inferred from EP 2152528 B1 that for surfaces with especially low changes in the degree of gloss in the course of weathering, surface coatings were used which require elaborate multi-step curing processes.

For adjusting the degree of gloss in the production of the coatings, additives such as for example matting agents are usually used. It is known from EP 338221 A1 that a matting agent can affect the scratch resistance of the surface. As additives which purposefully influence the structure on the surface of the coating, they are especially subjected to weathering and UV light so that in the course of use, a change in the degree of gloss can be observed.

It is the object of the present invention to provide a polymer-coated surface layer for a high pressure laminate panel (also referred to as HPL panel) which is characterized by high scratch resistance and excellent weather resistance, whose degree of gloss only changes slightly upon exposure to weathering and which can still easily be applied by means of a simple process without single- or multi-step radiation curing requiring elaborate technical equipment. Furthermore, the surface of the panel should be such that it is resistant to chemicals and that graffiti and other dirt can easily be cleaned off.

To solve this problem, according to a first aspect of the invention, a method is provided for the production of a high pressure laminate panel having a core layer and a polymer-coated surface layer on at least one panel surface, wherein the surface layer has as the outermost layer a polymer coating with a polyurethane(meth)acrylate polymer and wherein the method comprises the following steps:

a) applying a coating system as a coating on a surface material for a high pressure laminate panel, wherein the coating system comprises a resin component, a hardener component, and optional additives,
  wherein the resin component is present as a mixture of components A to D, in which
    component A is a polymerizable (meth)acrylate compound having at least 2 groups with a (meth)acrylic double bond and no hydroxy groups per molecule,
    component B is a polymerizable (meth)acrylate compound having one or more groups with a (meth)acrylic double bond as well as at least 2 hydroxy groups per molecule,
    component C is a polyurethane prepolymer having at least 2 hydroxy groups and no isocyanate groups per molecule,
    component D is a resin with an aminoplast structure having at least 2 hydroxy groups per molecule;
  and wherein the hardener component is an at least difunctional isocyanate; and b) drying the surface material coated in step a) at an elevated temperature at which a reaction takes place between the hydroxy groups in the resin component and the isocyanate groups of the hardener component so that a polyurethane polymer is formed in the coating which comprises groups with a (meth)acrylic double bond;

c) providing a laminate stack comprising a material for the formation of a core layer of a high pressure laminate panel, said material comprising one or more layers of a carrier material impregnated with curable synthetic resin, and comprising the coated surface material obtained in step b) as a surface layer so that at least on one side of the laminate stack the surface material obtained in step b) forms the outermost layer, and the dried coating is present on at least one surface of the laminate stack;

d) pressing the laminate stack at increased pressure and at a temperature above the drying temperature of step b) so that a polymerization of the (meth)acrylic double bonds in the dried coating takes place and a high pressure laminate panel with a core layer and a surface layer on at least one panel surface is formed which, as the outermost layer, has a polymer coating with a polyurethane(meth)acrylate polymer.

Surprisingly, it has been found that by using an aminoplast resin, which by itself is only slightly weather resistant, in combination with components A, B, and C, the degree of gloss of the coating undergoes only slight changes during the course of weathering. Furthermore, the inventors surprisingly found that in particular by using component C, a marked increase in scratch resistance can be achieved. According to the present invention, this is achieved without a resin, or a resin component, which has to be subjected to a complex radiation curing process. The sheets are furthermore characterized by an excellent resistance to chemicals, and graffiti and other dirt can easily be cleaned off them.

Thus, according to another aspect of the present invention, a high pressure laminate panel with a core layer and a polymer-coated surface layer on at least one panel surface is provided which, as the outermost layer, has a polymer coating with a polyurethane(meth)acrylate polymer, wherein the polymer-coated surface layer exhibits a scratch resistance of 6N, measured according to procedure EN 438-2.25, a change in the degree of gloss of no more than 5 units after 3,500 hours of weathering according to EN 438-2.29, measured according to EN ISO 2813 at an angle of 85°, and a chemical resistance level of measured according to EN 438-2.26:2005.

Another aspect of the invention is directed to a method for producing a polymer-coated surface material for a high pressure laminate panel as described in detail below.

The coating system applied in step a) of the method according to the present invention comprises a resin component, a hardener component, and optional additives.

The resin component is a mixture of components A, B, C, and D. In addition to components A to D, the resin component can comprise other monomer or polymer components and/or solvents. Preferably, the resin component consists of the components A to D and the optional solvent.

Component A

Component A is a polymerizable (meth)acrylate compound having at least 2 groups with a (meth)acrylic double bond and no hydroxy groups per molecule. Component A can be formed by one single type of such a polymerizable (meth)acrylate compound or it can contain several different types of such compounds.

As is known to the person skilled in the art, the terms "(meth)acryl" and "(meth)acrylate" are used as abbreviated forms for the terms methacryl or acryl and methacrylate or acrylate, respectively. Therefore, the term "(meth)acrylate compound" as a collective term encompasses compounds with acrylic ester groups $CH_2=CH-C(O)-O-$ as groups with a (meth)acrylic double bond and compounds with methacrylic ester groups $CH_2=CCH_3-C(O)-O-$ as groups with a (meth)acrylic double bond. Preferably, the groups with a (meth)acrylic double bond of the compounds of component A are acrylic ester groups.

The number of groups with a (meth)acrylic double bond, preferably acrylic ester groups, per molecule is at least 2, preferably 2 to 18, more preferred 2 to 10, and especially preferred 4 to 8.

Furthermore, in contrast to the compounds of component B as defined below, the compounds of component A do not comprise any hydroxy groups. Preferably, the compounds of component A are moreover free from —SH and —$NH_2$ groups. Especially preferred compounds of component A are compounds which do not comprise any other reactive groups in addition to the at least 2 groups with a (meth)acrylic double bond. As is readily apparent to the person skilled in the art, the term "reactive group" refers to possible reactions between components of the coating system; i.e. in these especially preferred compounds of component A, the at least 2 groups with a (meth)acrylic double bond, preferably at least 2 acrylic ester groups, are the only groups capable of reacting with other components of the coating system to form a covalent bond. As is also clear to the person skilled in the art, this applies in particular under the conditions the coating system is subjected to during the course of the method according to the present invention (i.e. in particular during application in step a), drying in step b), formation of a laminate stack in step c) and pressing of the laminate stack in step d)).

It is preferred that component A comprise compounds selected from the formulae (A1) and (A2), more preferred a mixture of the compounds of formulae (A1) and (A2). It is especially preferred that component A consist of compounds of the formulae (A1) and (A2).

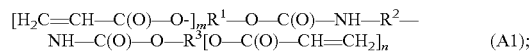

$[H_2C=CH-C(O)-O-]_mR^1-O-C(O)-NH-R^2-NH-C(O)-O-R^3[O-C(O)-CH=CH_2]_n$ (A1);

wherein $R^1$ and $R^3$ are independently selected from an aliphatic hydrocarbon group, an aliphatic polyether group, and an aliphatic polyester group, $R^2$ is an aliphatic or cycloaliphatic hydrocarbon group, n=2-9, preferably 2-4, and m=2-9, preferably 2-4. As can be seen from the formula, m acrylic ester groups $H_2C=CH-C(O)-O-$ are each bound via an ester group to the group $R^1$, and n acrylic ester groups to the group $R^3$.

Preferably, $R^1$ and $R^3$ are independently selected from linear or branched, preferably branched, alkyl groups, especially preferred from alkyl groups with 3 to 10, more preferred 3 to 6, C-atoms. $R^2$ is preferably an alkyl group which can be open-chained (i.e. linear or branched) or cyclic or in which open chain or branched units can be combined, especially preferred an alkyl group with 3 to 20, more preferred 6 to 12, C-atoms.

Unless otherwise stated, within the framework of the present description, the terms "alkyl" or "alkyl group" are not limited to monovalent saturated hydrocarbon groups but can, as can be inferred from the context in which they are used, also include groups with a higher number of valencies. As can for example be seen from formula (A1), $R^1$ in its preferred form as alkyl group in the formula (A1) for example provides m+1 valencies for bonding to neighboring groups. This applies analogously to other components of the coating system as well.

$[H_2C=CH-C(O)-O-]_oR^4$ (A2)

wherein $R^4$ is an aliphatic hydrocarbon group, and o=2-6, preferably 3-5. Preferably, $R^4$ is a linear or branched, preferably branched, alkyl group, especially preferred an alkyl group with 3 to 10, more preferred 3 to 6, C-atoms.

Component B

Component B is a polymerizable (meth)acrylate compound having one or more groups with a (meth)acrylic double bond as well as at least 2 hydroxy groups per molecule. Component B can be formed of one single type of such a polymerizable (meth)acrylate compound or it can contain several different types of such compounds.

Preferably, the groups with a (meth)acrylic double bond of the compounds of component B are acrylic ester groups.

The number of groups with a (meth)acrylic double bond, preferably acrylic ester groups, per molecule is at least 2, preferably 2 to 9, especially preferred 2 to 4. Moreover, the compounds of component B comprise at least 2 hydroxy groups, preferably 2 to 5, especially preferred 2. The hydroxy groups are usually alcoholic hydroxy groups.

Component B preferably comprises compounds of the formula (B1) and especially preferred it consists of compounds of the formula (B1):

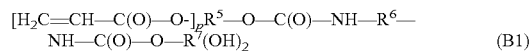

$[H_2C=CH-C(O)-O-]_pR^5-O-C(O)-NH-R^6-NH-C(O)-O-R^7(OH)_2$ (B1)

wherein $R^5$ is selected from an aliphatic hydrocarbon group, an aliphatic polyether group or an aliphatic polyester group, $R^6$ and $R^7$ are independently an aliphatic or cycloaliphatic hydrocarbon group, and p=2-9, preferably 2-4. As can be seen from the formula, p acrylic ester groups $H_2C=CH-C(O)-O-$ are each bound via an ester group to the group $R^5$, and 2 hydroxy groups are bound to the group $R^7$.

$R^5$ is preferably a linear or branched, preferably branched, alkyl group, especially preferred an alkyl group with 3 to 10, more preferred 3 to 6, C-atoms. $R^6$ is preferably an alkyl group which can be open-chained (i.e. linear or branched) or cyclic or in which open chain or branched units can be combined, especially preferred an alkyl group with 3 to 20, more preferred 6 to 12, C-atoms. $R^7$ is preferably an alkyl group which can be open-chained (i.e. linear or branched) or cyclic or in which open chain or branched units can be combined, especially preferred a linear or branched alkyl group with 3 to 20, more preferred 3 to 10, C-atoms.

Component C

Component C is a polyurethane prepolymer having at least 2 hydroxy groups and no isocyanate groups per molecule. As is clear to the person skilled in the art, the hydroxy groups are generally alcoholic hydroxy groups. The polyurethane prepolymer can be linear or branched. It is preferably formed from a polyisocyanate with 2 to 4, preferably 2, isocyanate groups and a polyalcohol with 2 to 4, preferably 2 or 3, alcoholic hydroxy groups. The polyisocyanate and polyalcohol are preferably aliphatic compounds. The number of subunits in the polyurethane prepolymer which are formed from the polyisocyanate, and the number of subunits which are formed from the polyalcohol, is preferably 2 to 20 each, more preferred 2 to 9. The number of hydroxy groups per molecule of the polyurethane prepolymer is preferably 2 to 9, more preferred 2 to 5.

The polyurethane prepolymer of component C does not comprise isocyanate groups. Preferred as component C are those polyurethane prepolymers which do not comprise any other reactive groups in addition to the at least 2 hydroxy groups. As is readily apparent to the person skilled in the art, the term "reactive group" refers to possible reactions between components of the coating system; i.e. in these especially preferred polyurethane prepolymers of component C, the at least 2 hydroxy groups are the only groups capable of reacting with other components of the coating system to form a covalent bond. As is also clear to the person skilled in the art, this applies in particular under the conditions the coating system is subjected to during the course of the method according to the present invention (i.e. in particular during application in step a), drying in step b), formation of a laminate stack in step c) and pressing of the laminate stack in step d)).

Component C preferably comprises polyurethane prepolymers selected from the formulae (C1) and (C2), i.e. component C comprises a compound of the formula (C1) and/or a compound of the formula (C2). It is especially preferred that component C consist of polyurethane prepolymers selected from the compounds of formulae (C1) and (C2). Combinations of compounds of (C1) and (C2) are preferred.

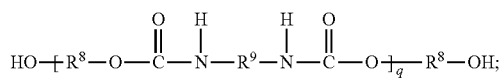
(C1)

wherein $R^8$, independently at every occurrence, is selected from an aliphatic hydrocarbon group which can be substituted with one or more hydroxyl groups, an aliphatic polyether group, and an aliphatic polyester group, $R^9$, independently at every occurrence, is selected from an aliphatic or cycloaliphatic hydrocarbon group, and q is 2-9.

It is preferred that all groups $R^8$ be the same and that all groups $R^9$ be the same.

Preferably, $R^8$ is a linear or branched, preferably branched, alkyl group, especially preferred an alkyl group with 3 to 10, more preferred 3 to 6, C-atoms. The alkyl group $R^8$ can also be substituted with one or more hydroxy groups. Preferably, 0, 1, or 2 such hydroxy substituents are present. $R^9$ is preferably an alkyl group which can be open-chained (i.e. linear or branched) or cyclic or in which open chain or branched units can be combined, especially preferred an alkyl group with 3 to 20, more preferred 6 to 12, C-atoms.

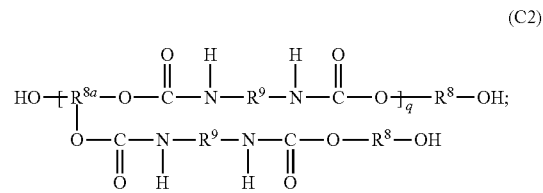
(C2)

wherein $R^8$ and $R^{8a}$, independently at every occurrence, are selected from an aliphatic hydrocarbon group, which can be substituted with one or more OH groups, an aliphatic polyether group, and an aliphatic polyester group, $R^9$, independently at every occurrence, is an aliphatic or cycloaliphatic hydrocarbon group, and q is 2-9.

For formula (C2), it is preferred that all groups $R^8$ and $R^{8a}$ are the same and all groups $R^9$ are the same.

Preferably, $R^8$ and $R^{8a}$ are each a linear or branched, preferably branched, alkyl group, especially preferred an alkyl group with 3 to 10, more preferred 3 to 6, C-atoms. The alkyl groups $R^8$ and $R^{8a}$ can also be substituted with one or more hydroxy groups. Preferably, $R^8$ has 1 or 2 hydroxy substituents, and $R^{8a}$ has 0 or 1 hydroxy substituent. $R^9$ is preferably an alkyl group which can be open-chained (i.e. linear or branched) or cyclic or in which open chain or branched units can be combined, especially preferred an alkyl group with 3 to 20, more preferred 6 to 12, C-atoms.

Component D

Component D is a resin with an aminoplast structure having at least 2 hydroxy groups per molecule. As is clear to the person skilled in the art, the hydroxy groups are generally alcoholic hydroxy groups. The basic structure of the resin of component D can also carry groups formed by the reaction of hydroxy groups, e.g. ester groups or urethane groups. Preferably 2 to 30, more preferred 10 to 30, hydroxy groups are present per molecule.

The resin with an aminoplast structure is preferably a cured resin in the form of a powder. The average molecular weight (Mn) of the resin of component D is preferably between 1,000 g/mol and 1,000,000 g/mol.

The resin with an aminoplast structure is preferably a resin with a urea-formaldehyde resin structure which can be obtained by polymerization (in particular polycondensation) of formaldehyde and urea, more preferred a cured resin in the form of a powder with a urea-formaldehyde resin structure.

The resin component of the coating composition is present as a mixture of components A, B, C and D, optionally in a solvent.

Examples of solvents include the following: Esters such as ethyl acetate, butyl acetate, 2-butoxyethyl acetate, aliphatic, cycloaliphatic and aromatic hydrocarbons, alcohols, glycols, glycol ethers or ketones.

The concentration of components A to D in the solvent can, for example, be 65 wt. % to 95 wt. %, based on the total weight of the solution.

For the preparation of the resin component of the coating system, components A to D can be provided and mixed. Alternatively, especially for the provision of components A (such as e.g. the compound of formula (A1)), B, and C, starting products such as polyols, polyisocyanates, and/or mixed-functional compounds such as a polyacrylate, can be mixed with one or more hydroxyl groups from which components A, B, and C are prepared during a synthesis of the resin component. For instance, the resin component can be prepared by way of a single- or multi-step synthesis at temperatures of 30 to 130° C. Preferably, during the synthesis of the resin component, the resin with an aminoplast structure as component D is present in the synthetic mixture from the onset of the synthesis.

During the preparation of the resin component, the mixture is preferably thermally heated to a temperature of 30 to 130° C. after the addition of the resin with an aminoplast structure D.

In the resin component, component A is preferably present in an amount of 40.0 to 80.0 wt. %, component B is present in an amount of 19.0 to 55.0 wt. %, component C is present in an amount of 0.5 to 5.0 wt. %, and component D is present in an amount of 0.5 to 7.0 wt. %, based on the total weight of components A to D as 100 wt. %. In a more preferred embodiment, the resin component comprises the component of formula (A1) in an amount of 15.0 to 45.0 wt. %, the component of formula (A2) in an amount of 15.0 to 45.0 wt. % (wherein the total amount of (A1) and (A2) is 40.0 to 80.0 wt. %), the component of formula (B1) in an amount of 19.0 to 55.0 wt. %, the components (C1) and (C2) in a total amount of 0.5 to 5.0 wt. %, and component D in an amount of 0.5 to 7.0 wt. %. Again, the sum of the components is 100 wt. %.

In an even more preferred embodiment, the resin component comprises the component of formula (A1) in an amount of 20.0 to 40.0 wt. %, the component of formula (A2) in an amount of 20.0 to 40.0 wt. % (wherein the total amount of (A1) and (A2) is 40.0 to 80.0 wt. %), the component of formula (B1) in an amount of 25.0 to 47.0 wt. %, the components (C1) and (C2) in a total amount of 0.6 to 3.0 wt. %, and component D in an amount of 1.0 to 5.0 wt. %. Again, the sum of the components is 100 wt. %.

In an especially preferred embodiment, the resin component comprises the component of formula (A1) in an amount of 25.0 to 35.0 wt. %, the component of formula (A2) in an amount of 25.0 to 35.0 wt. % (wherein the total amount of (A1) and (A2) is 50.0 to 70.0 wt. %), the component of formula (B1) in an amount of 30.0 to 42.0 wt. %, the components (C1) and (C2) in a total amount of 0.8 to 2.0 wt. % and component D in an amount of 2.0 to 4.5 wt. %. Again, the sum of the components is 100 wt. %.

Component D is preferably used in such an amount in the coating composition that the content of N (nitrogen) from —N—CO—N— groups in the polymer coating of the surface material or the surface layer, respectively, obtained with the help of the coating composition is between 1 and 30 wt. %, preferably between 3 and 25 wt. %, and more preferred between 5 and 20 wt. %, based on the total nitrogen content of the polymer coating. It can be determined by means of surface-sensitive analytical methods for structure identification known to the person skilled in the art. A preferred example of such a process is a process for chemical characterization by means of XPS spectroscopy according to EN ISO 10993-18:2009.

In addition to the resin component, the coating system comprises a hardener component which is an at least difunctional isocyanate. Preferably, the isocyanate of the hardener comprises 2 to 4 isocyanate groups. The isocyanate groups can optionally be blocked in their reactivity at room temperature.

Preferred examples of the hardener components are the following (i) to (iii):

(i) An isocyanate of the formula $R^{11}[-N=C=O]_s$, wherein s is 2 to 4, preferably 2 or 3, and $R^{11}$ is an aliphatic or cycloaliphatic hydrocarbon group, preferably an alkyl group which can be open-chained (i.e. linear or branched) or cyclic or in which open chain or branched units can be combined, especially preferred an alkyl group with 3 to 20, more preferred 3 to 12, C-atoms.

(ii) An oligomer, e.g. a trimer, of isocyanates of the formula given in (i). A preferred example of such an oligomer is the trimer of hexamethylene diisocyanate.

(iii) A derivative of the isocyanates mentioned in (i) or (ii), wherein the isocyanate groups are blocked in their reactivity at room temperature.

Preferably, the hardener component is used in an amount to result in an excess of isocyanate groups in the hardener component compared to the hydroxy groups in the resin component.

The proportion between resin component and hardener component in the coating system (as a ratio of the parts by weight of components A+B+C+D to parts by weight of the hardener component) is preferably in the range of 100/20 to 100/40, especially preferred 100/25 to 100/31.

For providing the coating system, the resin component and the hardener component are mixed, if applicable, together with the optional additives. After mixing of the two components, the pot life of the coating system is typically in the range of one to several hours, e.g. between 1 and 3 hours.

Optional additives which can be added to the coating system are known to the person skilled in the art. Examples, which can be used individually or in combination, include inhibitors to prevent premature polymerization of the (meth) acrylic double bonds, catalysts, polymerization initiators, light stabilizers, fillers, dyes, pigments, additives for influencing the degree of gloss, solubilizers, flame retardants, UV absorbers and additives for improving conductivity.

Preferably, the coating system comprises one or more polymerization initiators as additives, i.e. a compound which forms free radicals upon heating, e.g. heating to temperatures of 130° C. or higher. An example of a suitable polymerization initiator is tert. butyl perbenzoate.

The amount of additives can be selected appropriately by the person skilled in the art. Preferably, the coating system consists of the resin component and the hardener component in a total amount of at least 90 wt. %, and the optional additives in an amount of at most 10 wt. %, based on the total weight of the coating composition as 100 wt. %. The amounts given refer to the solids content, i.e. optionally present solvents are not included.

The coating composition is typically liquid at 25° C. and normal pressure and for example exhibits a viscosity of 500 to 3,000 mPas.

According to the method of the present invention, the coating system is applied as a coating on a surface material of a high pressure laminate panel. Such surface materials for high pressure laminate panels are known to the person skilled in the art. It is usually a planar material, i.e. a material whose length and breadth are significantly larger than its thickness, such as a film, a web, or a sheet of material.

Examples of suitable surface materials include webs, non-woven materials, or wovens of natural or synthetic organic or inorganic fibers, in particular in the form of sheets of such materials, sheets or films of plastic materials (thermoplastics, thermosets, or elastomers), metal, wood, stone, glass, or composite materials. A preferred example of a surface material is paper, e.g. in the form of a paper web or sheet.

A paper web or sheet impregnated with a curable synthetic resin is especially preferred as surface material. Synthetic resins known for their use in high pressure laminate panels can be used as curable synthetic resin, such as phenol-formaldehyde resin (PF resin), melamine-formaldehyde resin (MF resin), urea-formaldehyde resin (UF resin) or mixtures thereof, epoxy resins, polyester resins, thermoplastics or elastomers. Phenol-formaldehyde resin (PF resin), melamine-formaldehyde resin (MF resin), urea-formaldehyde resin (UF resin) or mixed resins thereof are preferably used as curable synthetic resins.

The surface material coated in step a) is furthermore preferably a decorative layer for a high pressure laminate panel which can, e.g., comprise dyes or pigments, and especially preferred a decorative paper impregnated with a curable synthetic resin.

The coating system can be applied to the surface material as a coating by means of known processes, e.g. by means of rollers. The coating is preferably applied such that a closed film of the coating composition is formed on the surface material. The amount applied is preferably in the range of 20 to 150 g/m², especially preferred in the range of 50 to 100 g/m².

The application of the coating system is followed by the step of drying the coated surface material. As is obvious to the person skilled in the art, the term drying in this context indicates the transition of the coating system from a liquid state to a state where it is no longer flowable when the surface material is handled. Any possibly present solvent is completely or partially removed during this step.

Drying is carried out at an elevated temperature at which a reaction takes place in the coating system between the hydroxy groups in the resin component and the isocyanate groups in the hardener component so that a polyurethane polymer is formed in the coating which comprises groups with a (meth)acrylic double bond. Components of the coating system which do not comprise functional groups which could react with the hardener component are not involved in the drying reaction. Typically, drying is carried out at a temperature of 130° C. or less, preferably in a temperature range of 100 to 130° C. At those temperatures, the reaction with the hardener component is guaranteed to proceed at a sufficient rate while the (meth)acrylic double bonds are not yet polymerized. An inhibitor can be added to the coating system which supports the prevention of the polymerization of the (meth)acrylic double bonds during the drying step.

After the drying step, the surface material advantageously comprises a coating which is dry to handle and block resistant. Such a coated surface material can be processed to a laminate stack with other layers without problems, i.e. without undesired curling.

After drying of the surface material, a laminate stack is provided which comprises a material for forming a core layer of a high pressure laminate panel and the coated surface material as surface layer. The dried, coated surface material forms the outermost layer of the laminate stack on at least one side of the laminate stack, optionally on both sides, and the dried coating is present on at least one, optionally both, surfaces of the laminate stack.

The material for forming a core layer of a high pressure laminate panel comprises one or more, preferably more, layers of a carrier material impregnated with a curable synthetic resin. Suitable carrier materials are known to the person skilled in the art. It is usually a planar carrier material, i.e. a material whose length and breadth are significantly larger than its thickness, such as a film, a web, or a sheet of material. The layers can consist of the same material, or of two or more different materials.

Examples of suitable carrier materials include webs, nonwoven materials, or wovens of natural or synthetic organic or inorganic fibers, in particular in the form of webs of such materials. A preferred example of a carrier material is paper, e.g. in the form of a paper web or sheet.

Synthetic resins known for their use in high pressure laminate panels can be used as curable synthetic resin for impregnating the layers of the carrier material, such as phenol-formaldehyde resin (PF resin), melamine-formaldehyde resin (MF resin), urea-formaldehyde resin (UF resin) or mixed resins thereof, epoxy resins, polyester resins, thermoplastics or elastomers. Phenol-formaldehyde resin (PF resin), melamine-formaldehyde resin (MF resin), urea-formaldehyde resin (UF resin) or mixed resins thereof are preferably used as curable synthetic resins.

The material for forming a core layer in a high pressure laminate panel comprises one or more, preferably more, layers of the carrier material impregnated with a curable synthetic resin. Preferably, the number of layers is in the range of 1 to 200, in particular 2 to 120.

After the laminate stack is provided, it is pressed at an increased pressure and at a temperature above the drying temperature of the coated surface material. The temperature is sufficiently high for polymerization of the (meth)acrylic double bonds to take place in the dried coating.

The pressure applied during pressing is usually in the range of 50 to 90 kPa. The temperature is usually higher than 130° C., preferably in the range of 135 to 150° C. Pressing is usually carried out over a time period of 10 to 100 minutes.

If desired, the pressing can be carried out in a in a hot press equipped with a structuring surface which imparts a surface structure to the high pressure laminate panel.

According to the present invention, a high pressure laminate panel is formed with a core layer and a surface layer on at least panel surface which, as the outermost layer, comprises a polymer coating with a polyurethane(meth)acrylate polymer, i.e. the polymer comprises polymerized units linked by means of urethane bonds, as well as polymerized units linked via carbon-carbon-bonds due to the polymerization reaction of the (meth)acrylic double bonds. Furthermore, due to the use of the resin with functional groups of component D in the coating system, the polymer also comprises subunits which are formed by a resin with an aminoplast structure. Preferably, the polymer coating consists of the polyurethane(meth)acrylate polymer formed, as described above, from the resin component, the hardener component, and the optional additives.

The polymer-coated surface material obtained after coating and drying can be conveniently transported, stored and processed further and therefore constitutes a valuable intermediate product in the production of high pressure laminate panels. Therefore, a method for the production of the polymer-coated surface material is another aspect of the present invention wherein, as was described above, the coating system is applied as a coating on a surface material for a high pressure laminate panel, the coated surface material is dried at an elevated temperature at which a reaction takes place between the hydroxy groups in the resin component and the isocyanate groups of the hardener component so that a polyurethane polymer is formed in the coating which comprises groups with a (meth)acrylic double bond, and, in addition, after drying the (meth)acrylic double bonds in the dried coating are optionally polymerized at a temperature above the drying temperature so that a polyurethane(meth) acrylate polymer is formed in the coating. The same parameters as given for the method for the production of the high pressure laminate panel according to the present invention apply to the coating system, the surface material, the drying conditions, and the temperature during the optional polymerization of the (meth)acrylic double bonds.

According to the present invention, high pressure laminate panels with a core layer and a polymer-coated surface layer on at least one sheet surface are provided, which as the outermost layer has a polymer coating with a polyurethane (meth)acrylate polymer. The polyurethane(meth)acrylate polymer comprises subunits which are formed by a resin with an aminoplast structure. The polymer-coated surface layer imparts a high scratch resistance and its degree of gloss undergoes only minor changes upon exposure to weathering. Furthermore, the surface of the sheet has a chemical resistance level of ≥4, i.e., in particular 4 or 5, measured according to EN 438-2.26:2005, and graffiti and other dirt can therefore easily be cleaned off. In particular, the polymer-coated surface layer exhibits a scratch resistance of ≥6N, measured according to EN 438-2.25:2005, a change in the degree of gloss of no more than 5 units, preferably no more than 3, after 3,500 hours of weathering according to the process of EN 438-2.29:2005, measured according to EN ISO 2813 at an angle of 85°. Preferably, the change in the degree of gloss, measured under the same conditions, does not amount to more than 20% compared to the initial value of 100% prior to weathering.

Preferably, the amount of —C=C— groups remaining in the polymer coating of the surface layer after the polymerization of the (meth)acrylic double bonds, determined by means of IR spectrometry, is between 0.01 and 5 wt. %, more preferred between 0.08 and 2.5 wt. %, based on the total weight of the polymer coating.

The content of N from —N—CO—N— groups in the polymer coating of the surface material is preferably between 1 and 30 wt. %, more preferred between 3 and 25 wt. %, and especially preferred between 5 and 20 wt. %, based on the total nitrogen content of the polymer coating. It can be determined by means of surface-sensitive analytical methods for structure identification known to the person skilled in the art. A preferred example of such a process is a process for chemical characterization by means of XPS spectroscopy according to EN ISO 10993-18:2009. Important aspects of the present invention are summarized in the following items:

1. Method for the production of a high pressure laminate panel having a core layer and a polymer-coated surface layer on at least one panel surface, wherein the surface layer has as the outermost layer a polymer coating with a polyurethane(meth)acrylate polymer and wherein the method comprises the following steps:

a) applying a coating system as a coating on a surface material for a high pressure laminate panel, wherein the coating system comprises a resin component, a hardener component, and optional additives,
        wherein the resin component is present as a mixture of components A to D, in which
            component A is a polymerizable (meth)acrylate compound having at least 2 groups with a (meth)acrylic double bond and no hydroxy groups per molecule,
            component B is a polymerizable (meth)acrylate compound having one or more groups with a (meth)acrylic double bond as well as at least 2 hydroxy groups per molecule,
            component C is a polyurethane prepolymer having at least 2 hydroxy groups and no isocyanate groups per molecule,
            component D is a resin with an aminoplast structure having at least 2 hydroxy groups per molecule;
        and wherein the hardener component is an at least difunctional isocyanate; and b) drying the surface material coated in step a) at an elevated temperature at which a reaction takes place between the hydroxy groups in the resin component and the isocyanate groups of the hardener component so that a polyurethane polymer is formed in the coating which comprises groups with a (meth)acrylic double bond;

c) providing a laminate stack comprising a material for the formation of a core layer of a high pressure laminate panel, said material comprising one or more, preferably more, layers of a carrier material impregnated with a curable synthetic resin, and comprising the coated surface material obtained in step b) as a surface layer so that at least on one side of the laminate stack the surface material obtained in step b) forms the outermost layer, and the dried coating is present on at least one surface of the laminate stack;

d) pressing the laminate stack at increased pressure and at a temperature above the drying temperature of step b) so that a polymerization of the (meth)acrylic double bonds in the dried coating takes place and a high pressure laminate panel with a core layer and a surface layer on at least one sheet surface is formed which as the outermost layer has a polymer coating with a polyurethane(meth)acrylate polymer.

2. Method for the production of a polymer-coated surface material for a high pressure laminate panel comprising the steps:

applying a coating system as a coating on a surface material for a high pressure laminate panel, wherein the coating system comprises a resin component, a hardener component, and optional additives,
        wherein the resin component is present as a mixture of components A to D, in which
            component A is a polymerizable (meth)acrylate compound having at least 2 groups with a (meth)acrylic double bond and no hydroxy groups per molecule,
            component B is a polymerizable (meth)acrylate compound having one or more groups with a (meth)acrylic double bond as well as at least 2 hydroxy groups per molecule,
            component C is a polyurethane prepolymer having at least 2 hydroxy groups and no isocyanate groups per molecule,
            component D is a resin with an aminoplast structure having at least 2 hydroxy groups per molecule;
        and wherein the hardener component is an at least difunctional isocyanate; and drying the surface material coated in step a) at an elevated temperature at which a reaction takes place between the hydroxy groups in the resin component and the isocyanate groups of the hardener component so that a polyurethane polymer is formed in the coating which comprises groups with a (meth)acrylic double bond, and, in addition, after drying optionally polymerizing the (meth)acrylic double bonds in the dried coating at a temperature above the drying temperature so that a polyurethane(meth)acrylate polymer is formed in the coating.

3. Method according to item 1 or 2, wherein the groups with a (meth)acrylic double bond of the compound of component A are acrylic ester groups.

4. Method according to any of items 1 to 3, wherein the number of groups with a (meth)acrylic double bond per molecule of the compound of component A is 2 to 18, preferably 2 to 10, and more preferred 4 to 8.

5. Method according to any of items 1 to 4, wherein the compound of component A does not comprise any other reactive groups in addition to the groups with a (meth)acrylic double bond.

6. Method according to any of items 1 to 5, wherein the (meth)acrylate compound of component A comprises a compound of the following formula (A1):

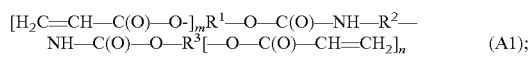

(A1);

wherein $R^1$ and $R^3$ are independently selected from an aliphatic hydrocarbon group, an aliphatic polyether group, and an aliphatic polyester group, $R^2$ is an aliphatic or cycloaliphatic hydrocarbon group, n=2-9, preferably 2-4, and m=2-9, preferably 2-4.

7. Method according to any of items 1 to 6, wherein the (meth)acrylate compound of component A comprises a compound of the following formula (A2):

(A2)

wherein $R^4$ is an aliphatic hydrocarbon group, and o=2-6, preferably 3-5.

8. Method according to any of items 1 to 7, wherein the groups with a (meth)acrylic double bond of the compound of component B are acrylic ester groups.

9. Method according to any of items 1 to 8, wherein the number of groups with a (meth)acrylic double bond per molecule of the compound of component B is 2 to 9, preferably 2 to 4.

10. Method according to any of items 1 to 9, wherein the number of hydroxy groups per molecule of the compound of component B is 2 to 5, preferably 2.

11. Method according to any of items 1 to 10, wherein the (meth)acrylate compound of component B comprises a compound of the following formula (B1):

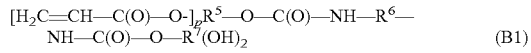

(B1)

wherein $R^5$ is selected from an aliphatic hydrocarbon group, an aliphatic polyether group, and an aliphatic polyester group, $R^6$ and $R^7$ are independently an aliphatic or cycloaliphatic hydrocarbon group, and p=2-9, preferably 2-4.

12. Method according to any of items 1 to 11, wherein the polyurethane prepolymer of component C does not comprise any other reactive groups in addition to the hydroxy groups.

13. Method according to any of items 1 to 12, wherein the polyurethane prepolymer of component C comprises a compound of the formula (C1) and/or a compound of the formula (C2):

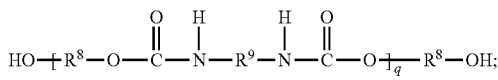

(C1)

wherein $R^8$, independently at every occurrence, is selected from an aliphatic hydrocarbon group, which can be substituted with one or more hydroxy groups, an aliphatic polyether group, and an aliphatic polyester group, $R^9$, independently at every occurrence, is selected from an aliphatic or cycloaliphatic hydrocarbon group, and q is 2-9;

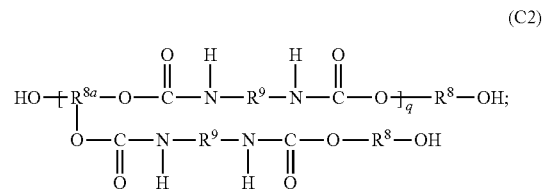

wherein $R^8$ and $R^{8a}$, independently at every occurrence, are selected from an aliphatic hydrocarbon group, which can be substituted with one or more OH groups, an aliphatic polyether group, and an aliphatic polyester group, $R^9$, independently at every occurrence, is an aliphatic or cycloaliphatic hydrocarbon group, and q is 2-9.

14. Method according to any of items 1 to 13, wherein the resin with an aminoplast structure of component D is a resin, preferably a cured resin in the form of a powder, with a urea-formaldehyde resin structure.

15. Method according to any of items 1 to 14, wherein the method comprises a step of preparing the coating system, wherein after addition of the resin with an aminoplast structure D, the mixture is thermally heated to a temperature of 30 to 130° C. during the preparation of the resin component.

16. Method according to any of items 1 to 15, wherein the method additionally comprises the synthesis of the resin component and the resin component is prepared by way of a single- or multi-step synthesis at temperatures of 30 to 130° C.

17. Method according to item 16, wherein during the synthesis of the resin component, the resin with an aminoplast structure as component D is present in the synthetic mixture from the onset of the synthesis.

18. Method according to any of items 1 to 17, wherein, in the resin component, component A is present in an amount of 40.0 to 80.0 wt. %, component B is present in an amount of 19.0 to 55.0 wt. %, component C is present in an amount of 0.5 to 5 wt. %, and component D is present in an amount of 0.5 to 7 wt. %, based on the total weight of the resin component as 100 wt. %.

19. Method according to any of items 1 to 18, wherein the isocyanate of the hardener component comprises 2 to 4 isocyanate groups.

20. Method according to any of items 1 to 19, wherein the hardener component is used in an amount to result in an excess of isocyanate groups in the hardener component compared to the hydroxy groups in the resin component.

21. Method according to any of items 1 to 20, wherein the coating system comprises a polymerization initiator as an additive.

22. Method according to any of items 1 to 21, wherein the coating system consists of the resin component and the hardener component in a total amount of at least 90 wt. %, and the optional additives in an amount of at most 10 wt. %, based on the total weight of the coating composition as 100 wt. %.

23. Method according to any of items 1 to 22, wherein the surface material for a high pressure laminate panel is a paper web impregnated with a curable synthetic resin.

24. Method according to any of items 1 to 23, wherein drying is carried out at a temperature of 130° C. or less.

25. Method according to any of items 1 and 3 to 24, wherein the carrier material impregnated with the curable synthetic resin is a paper web.

26. Method according to any of items 1 to 25, wherein the temperature for the polymerization of the (meth)acrylic double bonds is above 130° C.

27. Method according to any of items 1 and 3 to 26, wherein step d) is carried out in a hot press equipped with a structuring surface which imparts a surface structure to the high pressure laminate panel.

28. High pressure laminate panel with a core layer and a polymer-coated surface layer on at least one sheet surface, which as the outermost layer has a polymer coating with a polyurethane(meth)acrylate polymer, wherein the polymer-coated surface layer exhibits a scratch resistance of ≥6N, measured according to EN 438-2.25, a change in the degree of gloss of no more than 5 units after 3,500 hours of weathering according to the process of EN 438-2.29, measured according to EN ISO 2813 at an angle of 85°, and a chemical resistance level of ≥4, measured according to EN 438-2.26:2005.

29. High pressure laminate panel according to item 28, wherein the high pressure laminate panel comprises a content of N from —N—CO—N— groups in the polymer coating of the surface layer of between 1 and 30 wt. %, preferably between 3 and 25 wt. %, more preferred between 5 and 20 wt. %, based on the total content of N in the polymer coating, determined by means of XPS spectroscopy according to EN ISO 10993-18:2009.

30. High pressure laminate panel according to item 28 or 29, wherein the change in the degree of gloss does not amount to more than 20% compared to the initial value of 100% prior to weathering.

31. High pressure laminate panel according to any of items 28 to 30, characterized in that the amount of —C═C— groups in the polymer coating of the surface layer, determined by means of IR spectrometry, is between 0.01 and 5 wt. %, preferably between 0.08 and 2.5 wt. %, based on the total weight of the polymer coating.

32. High pressure laminate panel according to any of items 28 to 31, wherein the high pressure laminate panel is obtainable by the method according to any of items 1 and 3 to 27.

33. Use of a coating system as defined in item 1 in a method for the production of a decorative surface, characterized in that this surface, which comprises the polyurethane(meth)acrylate polymer, exhibits a scratch resistance of 6N, measured according to EN 438-2.25, a change in the degree of gloss of no more than 5 units after 3,500 hours of weathering according to the process of EN 438-2.29, measured according to EN ISO 2813 at an angle of 85°, and a chemical resistance level of 5, measured according to EN 438-2.26:2005.

EXAMPLES

Example 1

For preparing a coating system, 100 parts by weight of a mixture of the following components in n-butyl acetate and a total solids content of 70%: 32 parts by weight

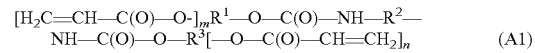   (A1)

wherein
$R^1$=(—$CH_2$—)$_3$C—$CH_2$—
$R^2$=3,3,5,5-tetramethylcyclohexanediyl
$R^3$=—$CH_2$—C($CH_2$-)$_3$
and n=3 and m=3;
32.6 parts by weight

   (A2)

wherein $R^4$=C($CH_2$-)$_4$ and o=4;
30.1 parts by weight

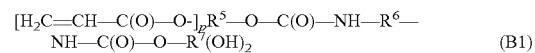   (B1)

wherein
$R^5$=(—$CH_2$—)$_3$C—$CH_2$—
$R^6$=3,3,5,5-tetramethylcyclohexanediyl
$R^7$=—$CH_2$—C($CH_2$—)$_2$—$CH_3$
and p=3;
1.9 parts by weight

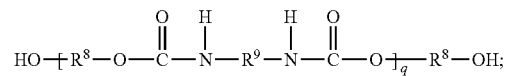   (C1)

wherein
$R^8$=—$CH_2$—C($CH_2$—$CH_3$)($CH_2$—OH)—($CH_2$)—
$R^9$=3,3,5,5-tetramethylcyclohexanediyl
and q=3; and

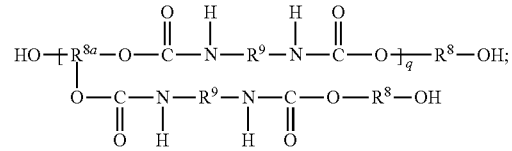   (C2)

wherein
$R^8$=—$CH_2$—C($CH_2$—$CH_3$)($CH_2$—OH)—($CH_2$)—
$R^{8a}$=—$CH_2$—C($CH_2$—$CH_3$)($CH_2$—)—($CH_2$)—
$R^9$=3,3,5,5-tetramethylcyclohexanediyl
and q=3; and
3.4 parts by weight
D: cured urea-formaldehyde resin with a molecular weight Mn of >1,000 g/mol]
are mixed in a reaction vessel with 28 parts by weight of a hardener component in the form of a trimerized hexamethylene diisocyanate with an isocyanate equivalent weight of 195, and 0.1 parts by weight of tert. butyl perbenzoate were added as radical former. The half-life period of tert. butyl perbenzoate at 140° C. is about 10 minutes. Common additives for coating systems can also be added to this coating system, such as flow agents, anti-foaming agents, light stabilizers, and degassing agents. The pot life of the coating system is 1-1.5 hours.

The coating system is applied in a coating machine to a paper web impregnated with curable resins as the surface material for a high pressure laminate panel by means of application rollers. The coating system is applied at a thickness of 80+/−3 g/m². Subsequently, a partial crosslinking reaction takes place between the isocyanate group of the hardener component and the free hydroxyl groups of the resin component in the dryer of a coating machine at a temperature of 125° C. so that a resin component with (meth)acrylic double bonds is formed. The throughput rate in the dryer is selected such that the coated carrier material is present as a dry-to-handle film which can be stored for an unlimited period of time.

For the production of high pressure laminate panels with a polyurethane acrylate surface, the coated surface material is stacked as follows with the other components of the laminate stack: coated surface material (decorated layer)/ core layer consisting of about 12 paper webs impregnated with phenolic resin/coated surface material (decorated layer). The polymer coating of the surface material is present as the outermost layer on both sides of the laminate stack.

This laminate stack is pressed for 20 minutes with a pressure of 80 bar and at a temperature of 140° C. At these reaction temperatures, the additional crosslinking reaction of the reactive (meth)acrylic double bonds takes place due to the radical formers present in the coating system, and a cured polyurethane acrylate is formed. At the same time, the impregnating resins used in the decorative and core layers are cured. After 20 minutes, the laminate stack is cooled under pressure and removed from the press. The surface properties of the thus obtained high pressure laminate panel are shown in the table below.

Example 2

For preparing a coating system, 100 parts by weight of a mixture of the following components in n-butyl acetate and a total solids content of 76%:

26 parts by weight

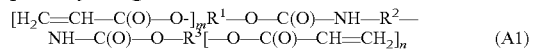  (A1)

wherein
R¹=(—CH₂)₃C—CH₂—
R²=3,3,5,5-tetramethylcyclohexanediyl
R³=—CH₂—C(CH₂—)₂—CH₂—CH₃
and n=2 and m=3;
30.5 parts by weight

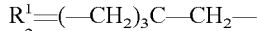  (A2)

wherein R⁴=C(CH₂-)₄ and o=4;
40.5 parts by weight

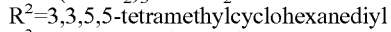  (B1)

wherein
R⁵=(—CH₂)₃C—CH₂—
R⁶=3,3,5,5-tetramethylcyclohexanediyl
R⁷=—CH₂—C(CH₂—)₂—CH₃
and p=3;
1.5 parts by weight (C1)

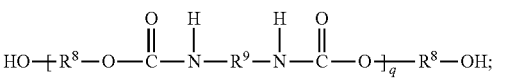

wherein
R⁸=—CH₂—C(CH₂—CH₃)(CH₂—OH)—(CH₂)—
R⁹=3,3,5,5-tetramethylcyclohexanediyl
and q=3; and

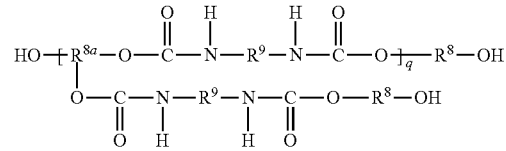

wherein
R⁵=—CH₂—C(CH₂—CH₃)(CH₂—OH)—(CH₂)—
R⁸ᵃ=—CH₂—C(CH₂—CH₃)(CH₂—)—(CH₂)—
R⁹=3,3,5,5-tetramethylcyclohexanediyl
and q=3; and
1.5 parts by weight
D: cured urea-formaldehyde resin with a molecular weight Mn of >1,000 g/mol]
are mixed in a reaction vessel with 28 parts by weight of a hardener component in the form of a trimerized hexamethylene diisocyanate with an isocyanate equivalent weight of 195, and 0.1 parts by weight of tert. butyl perbenzoate were added as radical former. The half-life period of tert. butyl perbenzoate at 140° C. is about 10 minutes. Common additives for coating systems can also be added to this coating system, such as flow agents, anti-foaming agents, light stabilizers, and degassing agents. The pot life of the coating system is 1-1.5 hours.

Subsequently, the coating system is applied to a surface material as described in Example 1, and a high pressure laminate panel is produced. The surface properties of the thus obtained high pressure laminate panel are shown in the table below.

Example 3

For preparing a coating system, 100 parts by weight of a mixture of the following components in n-butyl acetate and a total solids content of 82%:

35 parts by weight

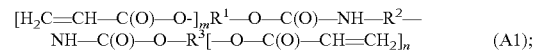  (A1);

wherein
R¹=(—CH₂)₃C—CH₂—
R2=—CH₂—C(CH₃)(CH₃)—CH₂—CH(CH₃)—CH₂—CH₂—
R³=—CH₂—C(CH₂-)₃
and n=3 and m=3;
25.8 parts by weight

  (A2)

wherein R⁴=C(CH₂-)₄ and o=4;
34 parts by weight

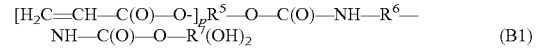  (B1)

wherein
R⁵=(—CH₂)₃C—CH₂—
R⁶=—CH₂—C(CH₃)(CH₃)—CH₂—CH(CH₃)—CH₂—CH₂—
R⁷=—CH₂—C(CH₂—)₂—CH₃
and p=3;
0.8 parts by weight

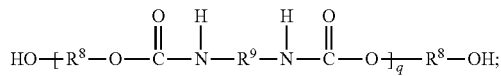

(C1)

wherein
$R^8 = -CH_2-C(CH_2-CH_3)(CH_2-OH)-(CH_2)-$
$R^9 = -CH_2-C(CH_3)(CH_3)-CH_2-CH(CH_3)-CH_2-CH_2-$
and q=3, and

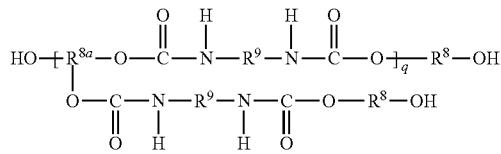

wherein
$R^8 = -CH_2-C(CH_2-CH_3)(CH_2-OH)-(CH_2)-$
$R^9 = -CH_2-C(CH_3)(CH_3)-CH_2-CH(CH_3)-CH_2-CH_2-$
$R^{8a} = -CH_2-C(CH_2-CH_3)(CH_2-)-(CH_2)-$
and q=3;
4.4 parts by weight
D: cured urea-formaldehyde resin with a molecular weight Mn of >1,000 g/mol]
are mixed in a reaction vessel with 28 parts by weight of a hardener component in the form of a trimerized hexamethylene diisocyanate with an isocyanate equivalent weight of 195, and 0.1 parts by weight of tert. butyl perbenzoate were added as radical former. The half-life period of tert. butyl perbenzoate at 140° C. is about 10 minutes. Common additives for coating systems can also be added to this coating system, such as flow agents, anti-foaming agents, light stabilizers, and degassing agents. The pot life of the coating system is 1-1.5 hours.

Subsequently, the coating system is applied to a surface material as described in Example 1, and a high pressure laminate panel is produced. The surface properties of the thus obtained high pressure laminate panel are shown in the table below.

Example 4

For preparing a coating system, 100 parts by weight of a mixture of the following components in n-butyl acetate and a total solids content of 75%:
29.4 parts by weight $[H_2C=CH-C(O)-O-]_mR^1-O-C(O)-NH-R^2-NH-C(O)-O-R^3[-O-C(O)-CH=CH_2]_n$ (A1);

wherein
$R^1 = (-CH_2)_3C-CH_2-$
$R2 = -CH_2-C(CH_3)(CH_3)-CH_2-CH(CH_3)-CH_2-CH_2-$
$R^3 = -CH_2-C(CH_2-)_2-CH_2-CH_3$
and n=2 and m=3;
31.5 parts by weight $[H_2C=CH-C(O)-O-]_oR^4$ (A2)

wherein $R^4 = C(CH_2-)_4$ and o=4;
33 parts by weight $[H_2C=CH-C(O)-O-]_pR^5-O-C(O)-NH-R^6-NH-C(O)-O-R^7(OH)_2$ (B1)

wherein
$R5 = (-CH_2)_3C-CH_2-$
$R^6 = -CH_2-C(CH_3)(CH_3)-CH_2-CH(CH_3)-CH_2-CH_2-$
$R^7 = -CH_2-C(CH_2-)_2-CH_3$
and p=3;
2.0 parts by weight

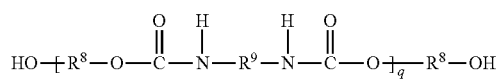

(C1)

wherein
$R^8 = -CH_2-C(CH_2-CH_3)(CH_2-OH)-(CH_2)-$
$R^9 = -CH_2-C(CH_3)(CH_3)-CH_2-CH(CH_3)-CH_2-CH_2-$
and q=3; and

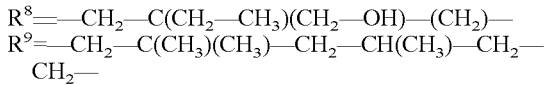

wherein
$R^8 = -CH_2-C(CH_2-CH_3)(CH_2-OH)-(CH_2)-$
$R^9 = -CH_2-C(CH_3)(CH_3)-CH_2-CH(CH_3)-CH_2-CH_2-$
$R^{8a} = -CH_2-C(CH_2-CH_3)(CH_2-)-(CH_2)-$
and q=3;
4.1 parts by weight
D: cured urea-formaldehyde resin with a molecular weight Mn of >1,000 g/mol]
are mixed in a reaction vessel with 28 parts by weight of a hardener component in the form of a trimerized hexamethylene diisocyanate with an isocyanate equivalent weight of 195, and 0.1 parts by weight of tert. butyl perbenzoate were added as radical former. The half-life period of tert. butyl perbenzoate at 140° C. is about 10 minutes. Common additives for coating systems can also be added to this coating system, such as flow agents, anti-foaming agents, light stabilizers, and degassing agents. The pot life of the coating system is 1-1.5 hours.

Subsequently, the coating system is applied to a surface material as described in Example 1, and a high pressure laminate panel is produced. The surface properties of the thus obtained high pressure laminate panel are shown in the table below.

|  | Example 1 | Example 2 | Example 3 | Example 4 |
|---|---|---|---|---|
| Weathering according to EN 438-2.29: 2005 | after 3,500 h: grey scale 5 appearance 5 | after 3,500 h: grey scale 4 appearance 5 | after 3,500 h: grey scale 4 appearance 5 | after 3,500 h: grey scale 4-5 appearance 5 |

-continued

|  | Example 1 | Example 2 | Example 3 | Example 4 |
|---|---|---|---|---|
| Scratch resistance according to EN 438-2.25: 2005 | 7N | 6N | 6N | 7N |
| Change in degree of gloss at 85° after weathering according to EN 438-2.29: 2005 measured after 3,500 h according to EN ISO 2813 | 2.0 units or 15% of the starting value | 1.6 units or 11% of the starting value | 2.5 units or 18% of the starting value | 2.1 units or 16% of the starting value |
| Chemical resistance according to EN 438-2.26: 2005 | Level 5 | Level 5 | Level 5 | Level 5 |
| Nitrogen content from —N—CO—N— groups based on the total N content according to EN ISO 10993-18: 2009 | 11% | 5% | 14% | 13% |

The invention claimed is:

1. Method for the production of a high pressure laminate panel having a core layer and a polymer-coated surface layer on at least one panel surface, wherein the surface layer has as the outermost layer a polymer coating with a polyurethane(meth)acrylate polymer and wherein the method comprises the following steps:
   a) applying a coating system as a coating on a surface material for a high pressure laminate panel, wherein the coating system comprises a resin component, a hardener component, and optional additives,
      wherein the resin component is present as a mixture of components A to D, in which
         component A is a polymerizable (meth)acrylate compound having at least 2 groups with a (meth)acrylic double bond and no hydroxy groups per molecule,
         component B is a polymerizable (meth)acrylate compound having both one or more groups with a (meth)acrylic double bond as well as at least 2 hydroxy groups per molecule,
         component C is a polyurethane prepolymer having at least 2 hydroxy groups and no isocyanate groups per molecule,
         component D is a resin with an aminoplast structure having at least 2 hydroxy groups per molecule;
      and wherein the hardener component is an at least difunctional isocyanate; and
   b) drying the surface material coated in step a) at an elevated temperature at which a reaction takes place between the hydroxy groups in the resin component and the isocyanate groups of the hardener component so that a polyurethane polymer is formed in the coating which comprises groups with a (meth)acrylic double bond;
   c) providing a laminate stack comprising a material for the formation of a core layer of a high pressure laminate panel, said material comprising one or more layers of a carrier material impregnated with a curable synthetic resin, and comprising the coated surface material obtained in step b) as a surface layer so that at least on one side of the laminate stack the surface material obtained in step b) forms the outermost layer, and the dried coating is present on at least one surface of the laminate stack;
   d) pressing the laminate stack at increased pressure and at a temperature above the drying temperature of step b) so that a polymerization of the (meth)acrylic double bonds in the dried coating takes place and a high pressure laminate panel with a core layer and a surface layer on at least one panel surface is formed which as the outermost layer has a polymer coating with a polyurethane(meth)acrylate polymer.

2. Method according to claim 1, wherein the compound of component A does not comprise any other reactive groups in addition to the groups with a (meth)acrylic double bond.

3. Method according to claim 1, wherein the (meth)acrylate compound of component A comprises a compound of the following formula (A1):

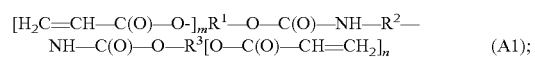

wherein $R^1$ and $R^3$ are independently selected from an aliphatic hydrocarbon group, an aliphatic polyether group, and an aliphatic polyester group, $R^2$ is an aliphatic or cycloaliphatic hydrocarbon group, n=2-9, and m=2-9.

4. Method according to claim 1 wherein the (meth)acrylate compound of component A comprises a compound of the following formula (A2):

wherein $R^4$ is an aliphatic hydrocarbon group, and o=2-6.

5. Method according to claim 1, wherein the (meth)acrylate compound of component B comprises a compound of the following formula (B1):

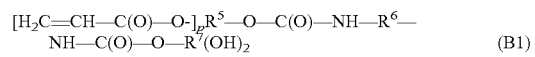

wherein $R^5$ is selected from an aliphatic hydrocarbon group, an aliphatic polyether group, and an aliphatic polyester group, $R^6$ and $R^7$ are independently an aliphatic or cycloaliphatic hydrocarbon group, and p=2-9.

6. Method according to claim 1, wherein the polyurethane prepolymer of component C does not comprise any other reactive groups in addition to the hydroxy groups.

7. Method according to claim 1, wherein the polyurethane prepolymer of component C comprises a compound of the formula (C1) and/or (C2):

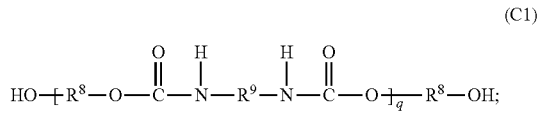
(C1)

wherein $R^8$, independently at every occurrence, is selected from an aliphatic hydrocarbon group which can be substituted with one or more hydroxyl groups, an aliphatic polyether group, and an aliphatic polyester group, $R^9$, independently at every occurrence, is selected from an aliphatic or cycloaliphatic hydrocarbon group, and q is 2-9;

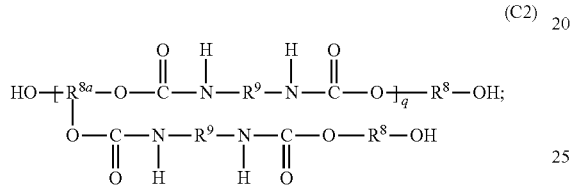
(C2)

wherein $R^8$ and $R^{8a}$, independently at every occurrence, are selected from an aliphatic hydrocarbon group, which can be substituted with one or more OH groups, an aliphatic polyether group, and an aliphatic polyester group, $R^9$, independently at every occurrence, is an aliphatic or cycloaliphatic hydrocarbon group, and q is 2-9.

8. Method according to claim 1, wherein the resin with an aminoplast structure of component D is a resin with a urea-formaldehyde resin structure.

9. Method according to claim 1, wherein in the resin component, component A is present in an amount of 40.0 to 80.0 wt. %, component B is present in an amount of 19.0 to 55.0 wt. %, component C is present in an amount of 0.5 to 5 wt. %, and component D is present in an amount of 0.5 to 7 wt. %, based on the total weight of the resin component as 100 wt. %.

10. Method according to claim 1, wherein drying is carried out at a temperature of 130° C. or less.

11. Method according to claim 1, wherein the temperature for the polymerization of the (meth)acrylic double bonds is above 130° C.

12. Method according to claim 1, wherein step d) is carried out in a hot press equipped with a structuring surface which imparts a surface structure to the high pressure laminate panel.

13. Method for the production of a polymer-coated surface material for a high pressure laminate panel comprising the steps:
 applying a coating system as a coating on a surface material for a high pressure laminate panel, wherein the coating system comprises a resin component, a hardener component, and optional additives,
  wherein the resin component is present as a mixture of components A to D, in which
   component A is a polymerizable (meth)acrylate compound having at least 2 groups with a (meth)acrylic double bond and no hydroxy groups per molecule,
   component B is a polymerizable (meth)acrylate compound having one or more groups with a (meth) acrylic double bond as well as at least 2 hydroxy groups per molecule,
   component C is a polyurethane prepolymer having at least 2 hydroxy groups and no isocyanate groups per molecule,
   component D is a resin with an aminoplast structure having at least 2 hydroxy groups per molecule;
 and wherein the hardener component is an at least difunctional isocyanate; and
 drying the surface material coated in step a) at an elevated temperature at which a reaction takes place between the hydroxy groups in the resin component and the isocyanate groups of the hardener component so that a polyurethane polymer is formed in the coating which comprises groups with a (meth)acrylic double bond, and, in addition, after drying optionally polymerizing the (meth)acrylic double bonds in the dried coating at a temperature above the drying temperature so that a polyurethane(meth)acrylate polymer is formed in the coating.

* * * * *